(12) United States Patent
De Campo et al.

(10) Patent No.: US 12,275,858 B2
(45) Date of Patent: Apr. 15, 2025

(54) SELF-LUBRICATING COATING COMPOSITION

(71) Applicant: SOLVAY SPECIALTY POLYMERS ITALY S.P.A., Bollate (IT)

(72) Inventors: Floryan De Campo, Ixelles (BE); Matteo Fantoni, Vanzaghello (IT); Bertrand Pavageau, Villenave d'Ornon (FR); Kévin Bougis, Pessac (FR)

(73) Assignee: SOLVAY SPECIALTY POLYMERS ITALY S.P.A., Bollate (IT)

( * ) Notice: Subject to any disclaimer, the term of this patent is extended or adjusted under 35 U.S.C. 154(b) by 814 days.

(21) Appl. No.: 17/283,327

(22) PCT Filed: Oct. 25, 2019

(86) PCT No.: PCT/EP2019/079305
§ 371 (c)(1),
(2) Date: Apr. 7, 2021

(87) PCT Pub. No.: WO2020/089129
PCT Pub. Date: May 7, 2020

(65) Prior Publication Data
US 2022/0002585 A1    Jan. 6, 2022

(30) Foreign Application Priority Data
Oct. 31, 2018    (EP) .................................... 18306434

(51) Int. Cl.
| | | |
|---|---|---|
| *C09D 175/12* | (2006.01) | |
| *C08G 18/10* | (2006.01) | |
| *C08G 18/73* | (2006.01) | |
| *C08G 18/75* | (2006.01) | |
| *C08G 18/78* | (2006.01) | |
| *C08G 18/79* | (2006.01) | |
| *C08L 27/12* | (2006.01) | |
| *C08L 63/00* | (2006.01) | |
| *C09D 7/40* | (2018.01) | |
| *C09D 7/65* | (2018.01) | |

(52) U.S. Cl.
CPC ........... *C09D 175/12* (2013.01); *C08G 18/10* (2013.01); *C08G 18/73* (2013.01); *C08G 18/755* (2013.01); *C08G 18/7831* (2013.01); *C08G 18/791* (2013.01); *C08L 27/12* (2013.01); *C08L 63/00* (2013.01); *C09D 7/65* (2018.01); *C09D 7/69* (2018.01); *C08L 2205/18* (2013.01); *C08L 2207/53* (2013.01)

(58) Field of Classification Search
None
See application file for complete search history.

(56) References Cited

U.S. PATENT DOCUMENTS
5,633,086 A    5/1997    Hsu et al.
2019/0388861 A1    12/2019    Walters et al.

FOREIGN PATENT DOCUMENTS
| | | |
|---|---|---|
| EP | 1116759 A1 | 7/2001 |
| FR | 3059666 A1 | 6/2018 |
| JP | 11291769 A | 10/1999 |
| JP | 2001162515 A | 6/2001 |
| JP | 2002028848 A * | 1/2002 |
| JP | 2002028872 A | 1/2002 |
| JP | 2006064059 A | 3/2006 |
| WO | 2017046360 A1 | 3/2017 |

OTHER PUBLICATIONS

JP-2002028848-A English translation (Year: 2002).*

* cited by examiner

*Primary Examiner* — Jeffrey D Washville
(74) *Attorney, Agent, or Firm* — Osha Bergman Watanabe & Burton LLP

(57) ABSTRACT

The invention pertains to compositions comprising at least one polymer or precursors thereof, at least one liquid medium and a plurality of microcapsules having a cross-linked polymeric shell and a core containing at least one (per)fuoropolyether compound comprising a (per)fluoropolyoxyalkylene chain being a sequence of recurring units having at least one catenary ether bond and at least one fluorocarbon moiety.

18 Claims, No Drawings

SELF-LUBRICATING COATING COMPOSITION

CROSS REFERENCE TO RELATED APPLICATIONS

This application is a U.S. national stage entry under 35 U.S.C. § 371 of International Application No. PCT/EP2019/079305 filed Oct. 25, 2019, which claims priority to European patent application No. 18306434.4, filed Oct. 31, 2018. The entire contents of these applications are explicitly incorporated herein by this reference.

TECHNICAL FIELD

The invention relates to self-lubricating coating compositions and to a method for their manufacturing.

BACKGROUND ART

Coating compositions are widely employed to coat surfaces of different materials and for different applications.

In some applications, such as sealing and automotive, coating compositions are required to cover contacting surfaces which are prone to wear and tear. It is therefore necessary that said coating compositions provide effective and long lasting lubricant effect among contacting surfaces, avoiding their damage by the friction.

Self-lubricating coatings compositions are known in the prior art and several attempts have been made for addressing the challenge of providing friction control.

A common approach involved the addition of low friction fillers to said coating compositions, such as (per)fluoropolyethers (PFPEs).

For instance, JPH11291769 discloses a coating obtained by mixing a polyurethane prepolymer based on polytetramethylenglycol (PTMG) with a fluororesin in powder and a PFPE. However, the obtained friction coefficient values were not satisfactory.

Yet in this domain, U.S. Pat. No. 5,633,086 describes that the addition of a lubricant such as PFPE reduces the coefficient of friction and wear damage.

However, need is still felt to provide self-lubricating coating compositions providing friction reduction and control notably in harsh conditions.

SUMMARY OF INVENTION

The aim of the present invention is to make available a coating composition which provides effective and long lasting lubricant effect in a wide range of loads, which provides friction reduction and control in harsh conditions and which is suitable for tough mechanical applications.

In a first aspect, the present invention relates to a composition comprising:
- at least one polymer [polymer (A)] or precursors of said polymer [precursors (P)];
- at least one liquid medium [medium (E)], and
- a plurality of microcapsules [capsules (M)], said capsules (M) having a cross-linked polymeric shell and a core containing at least one (per)fuoropolyether compound [compound (PFPE)] comprising a (per)fluoropolyoxyalkylene chain [chain $(R_f)$], said chain $(R_f)$ being a sequence of recurring units having at least one catenary ether bond and at least one fluorocarbon moiety.

In a second aspect, the present invention relates to a process for preparing the coating composition (C) as defined above, said method comprising mixing said at least one polymer (A) or precursors thereof (P) and said capsules (M) in said at least one medium (E).

In a third aspect, the present invention relates to a method for forming an assembly comprising a substrate (S) and a coating layer [layer (L)] adhered to at least part of said substrate (S), said method comprising: coating at least part of said substrate (S) with the above identified composition (C), thus obtaining a wet coating layer [wet layer (WL)], and subsequently drying said wet layer (WL), thus obtaining the layer (L).

In a fourth aspect, the present invention relates to an assembly including a substrate (S) and a coating layer [layer (L)] adhered to at least a part of said substrate (S), wherein said layer (L) is made from the composition (C) as above defined.

DETAILED DESCRIPTION OF THE INVENTION

For the purposes of this invention, the expression "polymer (A)" is intended to designate both homopolymers and copolymers.

For the purposes of this invention, the term "elastomer" is intended to designate a polymer resin serving as a base constituent for obtaining a true elastomer.

True elastomers are defined by the ASTM, Special Technical Bulletin, No. 184 standard as materials capable of being stretched, at room temperature, to twice their intrinsic length and which, once they have been released after holding them under tension for 5 minutes, return to within 10% of their initial length in the same time.

The expression "polyisocyanate" is intended to indicate a polymer comprising at least two isocyanate groups.

The expression "aromatic polyisocyanate" is intended to indicate a polyisocyanate comprising at least one aromatic ring system and also encompasses araliphatic polyisocyanates.

The expression "cycloaliphatic polyisocyanate" is intended to indicate a polyisocyanate comprising at least one cycloaliphatic ring system.

The term "aliphatic polyisocyanate" is intended to indicate a polyisocyanate comprising exclusively linear or branched chains, i.e. acyclic compounds.

The term "(per)fluoroelastomer" is intended to indicate a fully or partially fluorinated elastomer, in particular comprising more than 10% (wt), preferably more than 30% (wt), of recurring units derived from at least one ethylenically unsaturated monomer comprising at least one fluorine atom (hereafter, (per)fluorinated monomer) and, optionally, recurring units derived from at least one ethylenically unsaturated monomer free from fluorine atom (hereafter, hydrogenated monomer).

Any amount expressed in "phr" is based on 100 weight parts of the polymer (A).

For the purpose of the invention, the term "particle" is intended to denote a mass of material that, from a geometrical point of view, has a definite three-dimensional volume and shape, characterized by three dimensions, wherein none of said dimensions exceed the remaining two other dimensions of more than 1000%. Generally, particles are not equidimensional, i.e. they are longer in one direction than in others, and include different shapes, such as spheroidal, rod-like, cobblestone, and the like.

In the present description, the use of parentheses "( ... )" before and after the names of compounds, symbols or numbers identifying formulae or parts of formulae like, for example, "composition (C)" and "polymer (A)", has the mere purpose of better distinguishing those names, symbols or numbers from the remaining text; thus, said parentheses could also be omitted.

Preferably, the amount of the capsules (M) ranges from 0.1 to 50 phr, more preferably from 0.5 to 15 phr, even more preferably from 1 to 10 phr, based on 100 weight parts of the polymer (A).

Preferably, the amount of the medium (E) ranges from 5 to 50 phr, more preferably from 5 to 30 phr, even more preferably from 5 to 15 phr, based on 100 weight parts of the polymer (A).

Compound (PFPE)

As said, the compound (PFPE) comprises a (per)fluoropolyoxyalkylene chain [chain ($R_f$)] being a sequence of recurring units having at least one catenary ether bond and at least one fluorocarbon moiety.

The nature of end groups in compound (PFPE) is not particularly limited; it is generally understood that functional groups comprising heteroatoms different from halogens may be present in (per)fluorocarbon end groups; such functional groups may include notably hydroxyl groups, acyl halide groups, carboxylic acid groups, ester groups, amide groups, ethylenically unsaturated groups, acrylic groups, (hetero)aromatic groups, and the like.

It is nonetheless understood that according to certain preferred embodiments, compound (PFPE) has (per)fluorocarbon end groups which do not comprise any heteroatom different from a halogen. According to these embodiments, compound (PFPE) complies with formula (I):

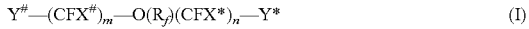

$$Y^\#-(CFX^\#)_m-O(R_f)(CFX^*)_n-Y^* \quad (I)$$

wherein:
Y# and Y*, equal to or different from each other, are selected from the group consisting of F, Cl, and a $C_1$-$C_3$ perfluoroalkyl group, said perfluoroalkyl group being preferably —$CF_3$;
m and n, equal to or different from each other, are integers equal to or higher than 1;
X# and X*, equal to or different from each other, are selected from the group consisting of F and a $C_1$-$C_3$ perfluoroalkyl group, said perfluoroalkyl group being preferably —$CF_3$;
$R_f$ is a fluoropolyoxyalkylene chain [chain ($R_f$)], as above detailed.

The chain ($R_f$) is preferably a sequence comprising, more preferably consisting of, repeating units independently selected from the group consisting of:
(i) —CFXO—, wherein X is F or $CF_3$;
(ii) —CFXCFXO—, wherein X, equal or different at each occurrence, is F or $CF_3$, with the proviso that at least one of X is —F;
(iii) —$CF_2CF_2CW_2O$—, wherein each of W, equal or different from each other, are F, Cl, H;
(iv) —$CF_2CF_2CF_2CF_2O$—;
(v) —$(CF_2)_j$—CFZ—O— wherein j is an integer from 0 to 3 and Z is a group of general formula —O—$R_{(f-a)}$-T, wherein $R_{(f-a)}$ is a fluoropolyoxyalkene chain comprising a number of repeating units from 0 to 10, said recurring units being chosen among the following: —CFXO—, —$CF_2CFXO$—, —$CF_2CF_2CF_2O$—, —$CF_2CF_2CF_2CF_2O$—, with each of X being independently F or $CF_3$ and T being a $C_1$-$C_3$ perfluoroalkyl group.

Preferably, chain ($R_f$) complies with the following formula:

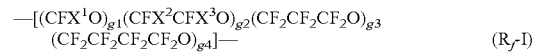

$$-[(CFX^1O)_{g1}(CFX^2CFX^3O)_{g2}(CF_2CF_2CF_2O)_{g3}(CF_2CF_2CF_2CF_2O)_{g4}]- \quad (R_f\text{-I})$$

wherein
$X^1$ is independently selected from —F and —$CF_3$,
$X^2$, $X^3$, equal or different from each other and at each occurrence, are independently —F, —$CF_3$, with the proviso that at least one of X is —F;
g1, g2, g3, and g4, equal or different from each other, are independently integers ≥0, such that g1+g2+g3+g4 is in the range from 2 to 300, preferably from 2 to 100; should at least two of g1, g2, g3 and g4 be different from zero.

More preferably, chain ($R_f$) is selected from chains of formula:

$$-[(CF_2CF_2O)_{a1}(CF_2O)_{a2}]- \quad (R_f\text{-IIA})$$

wherein:
a1 and a2 are independently integers ≥0 such that the number average molecular weight is between 400 and 10,000, preferably between 1,000 and 8,000; both a1 and a2 are preferably different from zero, with the ratio a1/a2 being preferably comprised between 0.1 and 10;

$$-[(CF_2CF_2CF_2O)_b]- \quad (R_f\text{-IIB})$$

wherein:
b is an integer >0 such that the number average molecular weight is between 400 and 10,000, preferably between 1,000 and 8,000;

$$-[(CF_2CF_2CF_2CF_2O)_c]- \quad (R_f\text{-IIC})$$

wherein:
c is an integer >0 such that the number average molecular weight is between 400 and 10,000, preferably between 1,000 and 8,000;

$$-[(CF_2CF_2O)_{d1}(CF_2O)_{d2}(CF(CF_3)O)_{d3}(CF_2CF(CF_3)O)_{d4}]- \quad (R_f\text{-IID})$$

wherein:
d1, d2, d3, d4, are independently integers ≥0 such that the number average molecular weight is between 400 and 10,000, preferably between 1,000 and 8,000; preferably d1 is 0, d2, d3, d4 are >0, with the ratio d4/(d2+d3) being ≥1;

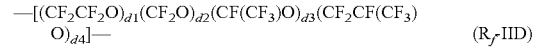

$$-[(CF_2CF_2O)_{e1}(CF_2O)_{e2}(CF_2(CF_2)_{ew}CF_2O)_{e3}]- \quad (R_f\text{-IIE})$$

wherein:
ew=1 or 2;
e1, e2, and e3 are independently integers ≥0 chosen so that the number average molecular weight is between 400 and 10,000, preferably between 1,000 and 8,000; preferably e1, e2 and e3 are all >0, with the ratio e3/(e1+e2) being generally lower than 0.2;

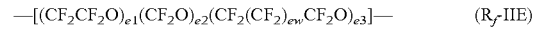

$$-[(CF(CF_3)CF_2O)_f]- \quad (R_f\text{-IIF})$$

wherein:
f is an integer >0 such that the number average molecular weight is between 400 and 10,000, preferably between 1,000 and 8,000.

Chains ($R_f$-IIA), ($R_f$-IIB), ($R_f$-IIC) and ($R_f$-IIE) are particularly preferred.

Still more preferably, chain ($R_f$) complies with formula ($R_f$-IIA), wherein:
a1, and a2 are integers >0 such that the number average molecular weight is between 400 and 10,000, preferably between 1,000 and 8,000, with the ratio a1/a2 being generally comprised between 0.1 and 10, more preferably between 0.2 and 5.

Capsules (M)

As said, the composition (C) comprises a plurality of capsules (M) having a cross-linked polymeric shell and a core comprising said at least one compound (PFPE), as detailed above.

Said capsules (M) have an average diameter preferably ranging from 4 µm to 8 µm, more preferably ranging from 4 µm to 6 µm.

The weight ratio between the core and the cross-linked polymeric shell of said capsules (M) preferably ranges from 20/80 to 80/20, preferably from 30/70 to 40/60, more preferably is 30/70.

The cross-linked polymeric shell of said capsules (M) has an average thickness preferably ranging from 0.1 µm to 1.5 µm, more preferably ranging from 0.7 µm to 1.3 µm, even more preferably ranging from 0.7 µm to 1.0 µm, most preferably ranging from 0.7 µm to 0.8 µm.

The polymeric shell of said capsules (M) is generally obtained by cross-linking at least one monomer or polymer, or a mixture of monomers or polymers, when polymerized.

By "monomer or polymer", it should be understood any building block suitable for forming a solid material by polymerization, either alone or in combination with other monomers or polymers.

Preferably, the monomer(s) are selected from monomers bearing at least one reactive function selected from the group consisting of acrylate, methacrylate, vinyl ether, N-vinyl-ether, mercaptoester, thiolen, siloxane, epoxy, oxetan, urethane, isocyanate, and peroxide. More preferably, the monomer(s) are selected from monomers also bearing at least one function selected from the group consisting of primary, secondary and tertiary alkylamine, quaternary amine, sulphate, sulfonate, phosphate, phosphonate, hydroxyl, carboxylate, and halogen.

Preferably, said polymer(s) are selected among: polyethers, polyesters, polyurethanes, polyureas, polyethylene glycols, polypropylene glycols, polyamides, polyacetals, polyimides, polyolefins, polysulfides, and polydimethylsiloxanes, said polymers bearing at least one reactive function selected from the group consisting of acrylate; methacrylate; vinyl ether; N-vinyl ether; mercaptoester; thiolen; siloxane; epoxy; oxetan; urethane; isocyanate; and peroxide. Examples of such polymers are cited in WO 2017/046360 (CALYXIA), whose content is hereby incorporated by reference.

In a first embodiment, at least one of said monomers or polymers bears a pH-sensitive group, a temperature-sensitive group, a UV-sensitive group or a IR-sensitive group, which is able to induce the rupture of capsules (M) and the subsequent release of their content, when stimulated by a pH, a temperature, a UV or a IR external trigger, respectively. Examples thereof are described in WO 2017/046360 (CALYXIA).

In a second alternative embodiment, said polymeric shell contains nanoparticles bearing on their surface at least one reactive function selected from the group consisting of acrylate, methacrylate, vinyl ether, N-vinyl ether, mercaptoester, thiolen, siloxane, epoxy, oxetan, urethane, isocyanate, and peroxide. These nanoparticles may generate heat when stimulated by an external electromagnetic field, inducing the rupture of the microcapsule and the subsequent release of its content. Suitable nanoparticles may be selected from gold, silver, and titanium dioxide nanoparticles (which react to an IR field) and iron oxide nanoparticles (which react to a magnetic field).

Polymer (A) and Precursors Thereof (P)

According to a first embodiment of the invention, the composition (C) comprises at least one polymer (A). Polymer (A) is selected among polymers able to form coatings, for example polyvinylidene fluoride (PVDF), polyvinylidene chloride (PVDC), polytetrafluoroethylene (PTFE), copolymers of tetrafluoroethylene (TFE), elastomers and aromatic polymers.

Among elastomers, polymer (A) may be selected from: acrylonitrile/butadiene rubber (NBR), isobutylene/isoprene rubber (IIR), polychloroprene (CR), polyacrylic rubber (ACM), EPDM rubber, chlorosulfonated polyethylene (CSM), polyurethanes (PU), silicones, (per)fluoroelastomers. Polymer (A) may also be selected from thermoplastic elastomers (TPE), thermoplastic vulcanizates (TPV) and thermoplastic polyurethanes (TPU).

According to a second embodiment of the invention, the composition (C) contains precursors of polymer (A) as above defined, which, upon mixing and under suitable conditions, react in situ to generate the polymer (A) itself.

In a preferred embodiment, the composition (C) contains precursors (P) of polyurethane, namely at least one polyisocyanate and at least one polyol.

Said at least one polyisocyanate may be selected among aliphatic, cycloaliphatic and aromatic polyisocyanates. Aliphatic polyisocyanates are preferred. Preferably, said at least one polyisocyanate is selected among: polyisocyanurates, biurets and adducts of diisocyanates. Preferably said diisocyanates are selected among: hexamethylendiisocyanate (HDI), isophorone diisocyanate (IPDI), toluendiisocyanate (TDI), diphenylmethandiisocyanate (MDI) and hydrogenated diphenylmethandiisocyanate (H12-MDI).

In a preferred embodiment, said at least one polyisocyanate is a trimer of hexamethylendiisocyanate (HDI), also known with the commercial name of Tolonate® HDT-LV.

In another preferred embodiment, said at least one polyisocyanate is a trimer of isophorone diisocyanate (IPDI), also known with the commercial name of Vestanat T1890@.

Preferably, said at least one polyol is selected among acrylic polyols, polyester polyols, polyether polyols, polyether-ester polyols and polycarbonate polyols.

According to various embodiment, said at least one polyol is solvent borne or water borne. Accordingly, said medium (E) is an organic solvent or water, respectively. Solvent borne polyols are solutions of polyols in an organic solvent, for example butyl acetate, xylene, methoxy propyl acetate and mixtures thereof.

In a preferred embodiment, said at least one polyol is a solution of an acrylic polyol in butyl acetate.

Medium (E)

Depending on the choice of the coating technology, the medium (E) may be effective in suspending and dispersing particles of said polymer (A) or precursors thereof (P), or may be effective in solubilizing said polymer (A) or precursors thereof (P).

Media (E) able to solubilize said polymer (A) or precursors thereof (P) are typically organic solvents.

Exemplary embodiments of organic solvents which may be used, alone or in combination, in composition (C) include notably:

aromatic hydrocarbons and more particularly aromatic hydrocarbons such as, in particular, benzene, toluene, xylenes, cumene, petroleum fractions composed of a mixture of alkylbenzenes;

aliphatic or aromatic halogenated hydrocarbons including more particularly, perchlorinated hydrocarbons such as, in particular, tetrachloroethylene, hexachloroethane; partially chlorinated hydrocarbons such as dichloromethane, chloroform, 1,2-dichloroethane, 1,1,2-trichloroethane, 1,1,2,2-tetrachloroethane, pentachloroethane, trichloroethylene, 1-chlorobutane, 1,2-dichlorobutane; monochlorobenzene, 1,2-dichlorobenzene, 1,3-dichlorobenzene, 1,4-dichlorobenzene, 1,2,4-trichlorobenzene or mixture of different chlorobenzenes;

aliphatic, cycloaliphatic or aromatic ether oxides, more particularly, diethyl oxide, dipropyl oxide, diisopropyl oxide, dibutyl oxide, methyltertiobutylether, dipentyl oxide, diisopentyl oxide, ethylene glycol dimethyl ether, ethylene glycol diethyl ether, ethylene glycol dibutyl ether benzyl oxide; 1,4-dioxane, tetrahydrofuran (THF);

aromatic amines, including notably pyridine, and aniline.

ketones such as methylethylketone, methylisobutyl ketone, diisobutylketone, cyclohexanone, isophorone, 2-heptanone;

linear or cyclic esters such as: isopropyl acetate, n-butyl acetate, methyl acetoacetate, dimethyl phthalate, γ-butyrolactone;

linear or cyclic carboxamides such as N,N-dimethylacetamide (DMAc), N,N-diethylacetamide, dimethylformamide (DMF), diethylformamide or N-methyl-2-pyrrolidinone (NMP);

organic carbonates for example dimethyl carbonate, diethyl carbonate, dipropyl carbonate, dibutyl carbonate, ethylmethyl carbonate, ethylene carbonate, vinylene carbonate;

phosphoric esters such as trimethyl phosphate, triethyl phosphate;

dimethylsulfoxide (DMSO); and diesters of formula ($I_{de}$), ester-amides of formula (Iea), or diamides of formula ($I_{da}$):

$R^1$—OOC-$A_{de}$-COO—$R^2$        ($I_{de}$)

$R^1$—OOC-$A_{ea}$-CO—$NR^3R^4$        ($I_{ea}$)

$R^5R^6N$—OC-$A_{da}$-CO—$NR^5R^6$        ($I_{da}$)

wherein:
- $R^1$ and $R^2$, equal to or different from each other, are independently selected from the group consisting of $C_1$-$C_{20}$ hydrocarbon groups;
- $R^3$, $R^4$, $R^5$ and $R^6$ equal to or different from each other and at each occurrence, are independently selected from the group consisting of hydrogen, $C_1$-$C_{36}$ hydrocarbon groups, possibly substituted, being understood that $R^3$ and $R^4$ might be part of a cyclic moiety including the nitrogen atom to which they are bound, said cyclic moiety being possibly substituted and/or possibly comprising one or more than one additional heteroatom, and mixtures thereof;
- $A_{de}$, $A_{ea}$, and $A_{da}$ equal to or different from each other, are independently a linear or branched divalent alkylene group.

According to an embodiment, medium (E) comprises, or preferably consists of, at least one organic solvent selected among those listed above, and more preferably from esters and ketones, as defined above.

According to another embodiment, medium (E) is an aqueous medium, that is to say a liquid medium comprising water as major liquid component, and preferably essentially consisting of water (with other minor liquid ingredients being possibly comprised, without these substantially affecting the aqueous character of the medium).

According to the latter embodiment, composition (C) can be qualified as an "aqueous dispersion", which means that the particles of polymer (A) or precursors thereof (P) are stably dispersed in an aqueous medium, so that settling of the particles does not occur within the time when the dispersion will be used.

According to the latter embodiment, composition (C) advantageously comprises at least one non-ionic non-fluorinated surfactant. Non-ionic non-fluorinated surfactants [surfactants (NS)] suitable for use in composition (C) are known in the art and examples thereof can be notably found in Nonionic Surfactants. Edited by SCHICK, M. J. Marcel Dekker, 1967. p. 76-85 and 103-141.

The particles of polymer (A) or precursors thereof (P) in the aqueous dispersion preferably possess an average particle size of at least 20 nm, preferably at least 30 nm, more preferably at least 50 nm, and/or of at most 450 nm, preferably at most 400 nm, most preferably at most 350 nm.

In an embodiment, said aqueous dispersion is obtained directly by the process known as dispersion (or emulsion, including micro-emulsion) polymerization (i.e. as crude polymerization latex) or can be obtained from said crude polymerization latex by post-treatment, such as e.g. upconcentration methods (clouding, ultrafiltration . . . ).

In another embodiment, said aqueous dispersion is prepared by any means known to those skilled in the art, preferably by means of size-reduction equipment, such as a high-pressure homogenizer, a colloid mill, a fast pump, a vibratory agitator or an ultrasound device.

The composition (C) can additionally comprise other conventional additives, such as fillers, thickeners, pigments, antioxidants, stabilizers, processing aids/plasticizers, and the like.

As said, the present invention also relates to a method for forming an assembly comprising a substrate (S) and a layer (L) adhered to at least part of said substrate (S), said method comprising: coating at least part of said substrate (S) with the composition (C), thus obtaining a wet layer (WL), and subsequently drying said wet layer (WL) to obtain the layer (L).

The substrate (S) is generally a metal substrate, including notably substrates of aluminium, copper, tin, zinc, iron, and alloys thereof, including steel, and stainless steel.

The substrate (S) is generally suitably degreased and cleaned before applying a coating of composition (C) on the same.

A step of roughening may be applied for increasing adhesion, although this being not specifically required.

Coating of composition (C) onto at least a part of the substrate (S) can be achieved by means of any coating method, including notably spray coating, spin-coating, brush-coating, dip-coating, blade coating and the like.

The method of the invention comprises a subsequent step of drying said wet layer (WL) for forming the layer (L) onto the substrate (S). Drying can be carried out at temperatures ranging from room temperature to beyond boiling point of the medium (E), and is intended advantageously to remove all volatile materials contained in the composition (C).

Should the disclosure of any of the patents, patent applications, and publications that are incorporated herein by reference conflict with the present description to the extent that it might render a term unclear, the present description shall take precedence.

Should the disclosure of any patents, patent applications and publications which are incorporated herein by reference conflict with the description of the present application to the extent that it may render a term unclear, the present description shall take precedence.

The present invention will be now described in more detail with reference to the following examples, whose purpose is merely illustrative and not limitative of the scope of the invention.

EXPERIMENTAL SECTION

Materials

Tolonate™ HDT-LV is a solvent-free aliphatic polyisocyanate based on hexamethylendiisocyanate trimer and commercially available from Vencorex.

Setalux 1907 BA-75 is acrylic polyol in butyl acetate commercially available from Nuplex.

Fomblin® YR 1800 is a perfluoropolyether commercially available from Solvay Specialty Polymers Italy.

Butyl acetate was obtained from Sigma-Aldrich.

2-Heptanone was obtained from Sigma-Aldrich.

Capsules having a polyepoxy shell, a Fomblin® YR 1800 PFPE-containing core, a core/shell weight ratio of 30/70, an average diameter of 4 µm and an average shell thickness of 0.7 µm have been produced using the methods described in WO 2017/046360 and FR 3059666.

Methods

Contact Angle

The contact angle was measured according to ASTM D7334 on the pristine sample after complete evaporation of the solvents and on the same sample after 50 cycles of abrasion. Said measures were run at a temperature of 23° C.

Abrasion Test

Soft abrasion was applied by hands using a sandpaper P1000.

PREPARATION OF SAMPLES

Example 1 (Ex. 1)

Capsules with a Fomblin YR 1800 PFPE-containing core were mixed with Tolonate™ (24 phr) and Setalux (76 phr) under magnetic stirring at 450 rpm and room temperature for 30 minutes in butyl acetate (8 phr) and 2-heptanone (7 phr). The so obtained formulation was blade coated on a substrate using Bird film Applicators® (70 to 200 µm). A homogeneous film was formed by solvent casting.

Five samples with different amount of capsules were prepared (Ex. 1A to 1E).

Example 2 of Comparison (Ex. 2)

Tolonate™ (24 phr) and Setalux (76 phr) were mixed under magnetic stirring at 450 rpm and room temperature for 10 minutes in butyl acetate (8 phr) and 2-heptanone (7 phr). The so obtained formulation was blade coated on a substrate using Bird film Applicators® (70 to 200 µm). A homogeneous film was formed by solvent casting.

Experimental Results

Table 1 shows the contact angle of the samples of examples 1A to 1E and example 2 of comparison before and after abrasion.

TABLE 1

| | | Average contact angle (°) | |
|---|---|---|---|
| | Capsule content [phr] | Pristine sample | After abrasion |
| Ex. 1A | 1 | 83 | 141 |
| Ex. 1B | 3 | 82 | 138 |
| Ex. 1C | 5 | 78 | 145 |
| Ex. 1D | 7 | 83 | 142 |
| Ex. 1E | 9 | 81 | 138 |
| Ex. 2 (comparison) | — | 81 | 105 |

The above results show that the samples of Ex. 1A to 1E have a much higher hydrophobicity (i.e. a greater contact angle) after abrasion than the sample of Ex. 2 of comparison. Accordingly, the samples of Ex. 1A to 1E present a much lower surface energy after abrasion and, therefore, lower friction coefficient and greater self-lubricating effect in the long term.

The invention claimed is:

1. A coating composition [composition (C)] comprising:
   at least one polymer [polymer (A)] or precursors (P) of said polymer (A),
   a liquid medium [medium (E)] and
   a plurality of microcapsules [capsules (M)], said capsules (M) having a cross-linked polymeric shell and a core containing at least one (per) fuoropolyether compound [compound (PFPE)] comprising a (per) fluoropolyoxyalkylene chain [chain (Rf)], said chain (Rf) being a sequence of recurring units having at least one catenary ether bond and at least one fluorocarbon moiety,
   wherein an amount of the at least one polymer [polymer (A)] in the composition (C) is provided in a greater amount than both of an amount of the liquid medium [medium (E)] and an amount of the plurality of microcapsules capsules (M)]; and
   wherein the amounts of the liquid medium [medium (E)] and the plurality of microcapsules [capsules (M)] are relative to the amount of the at least one polymer [polymer (A)].

2. The composition (C) according to claim 1, wherein said compound (PFPE) complies with formula (I):

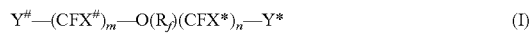

$$Y^\#—(CFX^\#)_m—O(R_f)(CFX^*)_n—Y^* \qquad (I)$$

wherein:
   $Y^\#$ and $Y^*$, equal to or different from each other, are selected from the group consisting of F, Cl, and a $C_1$-$C_3$ perfluoroalkyl group;
   m and n, equal to or different from each other, are integers equal to or greater than 1;
   $X^\#$ and $X^*$, equal to or different from each other, are selected from the group consisting of F and a $C_1$-$C_3$ perfluoroalkyl group;
   Rf is said chain (Rf).

3. The composition (C) according to claim 1, wherein said chain (Rf) is a sequence of recurring units comprising repeating units independently selected from the group consisting of:
   —CFXO—, wherein X is F or $CF_3$;
   —CFXCFXO—, wherein X, equal or different at each occurrence, is F or $CF_3$, with the proviso that at least one of X is —F;
   —$CF_2CF_2CW_2O$—, wherein each of W, equal or different from each other, are F, Cl, H;
   —$CF_2CF_2CF_2CF_2O$—;
   —$(CF_2)_j$—CFZ—O— wherein j is an integer from 0 to 3 and Z is a group of general formula —O—$R_{(f-a)}$-T, wherein $R_{(f-a)}$ is a fluoropolyoxyalkylene chain comprising a number of repeating units from 0 to 10, said recurring units being chosen among the following: —CFXO—, —CF$_2$CFXO—, —CF$_2$CF$_2$CF$_2$O—, and —CF$_2$CF$_2$CF$_2$CF$_2$O—, with each of X being independently F or CF$_3$ and T being a C$_1$-C$_3$ perfluoroalkyl group.

4. The composition (C) according to claim 1, comprising at least one polyisocyanate and at least one polyol as precursors (P) of a polyurethane.

5. The composition (C) according to claim 4, wherein said at least one polyisocyanate is selected among polyisocyanurates and biurets and adducts of diisocyanates.

6. The composition according to claim 5, wherein said at least one polyisocyanate is a trimer of hexamethylendiisocyanate (HDI) or a trimer of isophorone diisocyanate (IPDI).

7. The composition (C) according to claim 4, wherein said at least one polyol is selected among polyacrylate, polyester, polyether and polycarbonate polyols.

8. The composition according to claim 7, wherein said at least one polyol is solvent borne or water borne.

9. The composition (C) according to claim 1, wherein said medium (E) comprises at least one organic solvent.

10. The composition (C) according to claim 1, wherein the amount of said medium (E) ranges from 5 to 50 phr, based on 100 weight part of the polymer (A).

11. The composition (C) according to claim 1, wherein the amount of said capsules (M) ranges from 0.1 to 50 phr, based on 100 weight part of the polymer (A).

12. The composition (C) according to claim 1, wherein said capsules (M) have an average diameter ranging from 4 µm to 8 µm.

13. The composition (C) according to claim 1, wherein the weight ratio between the core and the cross-linked polymeric shell of said capsules (M) ranges from 20/80 to 80/20.

14. The composition (C) according to claim 1, wherein the cross-linked polymeric shell of said capsules (M) has an average thickness ranging from 0.1 µm to 1.5 µm.

15. The composition (C) according to claim 1, wherein said cross-linked polymeric shell is obtained by cross-linking at least one monomer or polymer, or a mixture of monomers or polymers, when polymerized, said monomer(s) bearing at least one reactive function selected from the group consisting of acrylate, methacrylate, vinyl ether, N-vinyl-ether, mercaptoester, thiolen, siloxane, epoxy, oxetan, urethane, isocyanate, and peroxide, said polymer(s) being selected among: polyethers, polyesters, polyurethanes, polyureas, polyethylene glycols, polypropylene glycols, polyamides, polyacetals, polyimides, polyolefins, polysulfides, and polydimethylsiloxanes, said polymers bearing at least one reactive function selected from the group consisting of acrylate; methacrylate; vinyl ether; N-vinyl ether; mercaptoester; thiolen; siloxane; epoxy; oxetan; urethane; isocyanate; and peroxide.

16. Process for preparing the coating composition (C) according to claim 1, comprising mixing said at least one polymer (A), or precursors thereof (P), and said capsules (M) into said at least one medium (E).

17. Method for forming an assembly comprising a substrate(S) and a coating layer [layer (L)] adhered to at least part of said substrate(S), said method comprising: coating at least part of said substrate(S) with the above identified composition (C), thus obtaining a wet coating layer [wet layer (WL)], and subsequently drying said wet layer (WL), thus obtaining the layer (L).

18. An assembly including a substrate(S) and a coating layer [layer (L)] adhered to at least a part of said substrate (S), wherein said layer (L) is made from composition (C) according to claim 1.

\* \* \* \* \*